(12) United States Patent
Hoeing

(10) Patent No.: US 7,156,533 B2
(45) Date of Patent: Jan. 2, 2007

(54) REARVIEW MIRROR FOR MOTOR VEHICLES

(75) Inventor: Thomas Hoeing, Roding (DE)

(73) Assignee: Flabeg GmbH & Co. KG, Fuerth (DE)

( * ) Notice: Subject to any disclaimer, the term of this patent is extended or adjusted under 35 U.S.C. 154(b) by 0 days.

(21) Appl. No.: 11/343,334

(22) Filed: Jan. 31, 2006

(65) Prior Publication Data

US 2006/0181760 A1    Aug. 17, 2006

(30) Foreign Application Priority Data

Feb. 2, 2005  (EP) .................. 05002130
May 17, 2005 (EP) .................. 05010582

(51) Int. Cl.
*G02B 5/08* (2006.01)
*G02B 1/10* (2006.01)

(52) U.S. Cl. ............. 359/883; 359/584; 359/585; 359/589

(58) Field of Classification Search .......... 359/883, 359/884, 603, 507, 267, 584, 585, 589
See application file for complete search history.

(56) References Cited

U.S. PATENT DOCUMENTS

| | | | | |
|---|---|---|---|---|
| 5,535,056 | A * | 7/1996 | Caskey et al. ............ | 359/603 |
| 5,594,585 | A | 1/1997 | Komatsu .................. | 359/512 |
| 5,750,265 | A * | 5/1998 | Goodman ................. | 428/432 |
| 5,861,189 | A * | 1/1999 | Sheel et al. .............. | 427/166 |
| 5,938,958 | A * | 8/1999 | Goodman et al. ........ | 219/219 |
| 6,020,987 | A * | 2/2000 | Baumann et al. ......... | 359/273 |
| 6,102,546 | A * | 8/2000 | Carter ...................... | 359/604 |
| 6,142,642 | A | 11/2000 | Krisko et al. ............. | 359/883 |
| 6,291,144 | B1 * | 9/2001 | Aylward et al. .......... | 430/359 |
| 6,312,131 | B1 * | 11/2001 | Yamamoto et al. ....... | 359/507 |
| 6,407,847 | B1 * | 6/2002 | Poll et al. ................. | 359/275 |
| 6,514,620 | B1 * | 2/2003 | Lingle et al. ............. | 428/428 |
| 6,797,366 | B1 * | 9/2004 | Hanson et al. ............ | 428/201 |
| 6,816,297 | B1 * | 11/2004 | Tonar et al. .............. | 359/265 |
| 7,064,897 | B1 * | 6/2006 | Hebrink et al. ........... | 359/487 |

FOREIGN PATENT DOCUMENTS

| | | |
|---|---|---|
| DE | 34 36 011 | 5/1986 |
| EP | 0 689 962 | 1/1996 |
| EP | 1 014 118 A1 | 6/2000 |
| JP | 2004-295055 | * 10/2004 |
| WO | WO 2005/111671 | * 11/2005 |

* cited by examiner

*Primary Examiner*—Ricky D. Shafer
(74) *Attorney, Agent, or Firm*—Darby & Darby

(57) ABSTRACT

A rearview mirror for motor vehicles having a layer substrate and a coating applied onto the back thereof, includes a reflective mirror coating and an intermediate layer, which may be made of a semiconductor material, arranged between the reflective mirror coating and the layer substrate. The value of the coloring parameter $C=\sqrt{a_0^2+b_0^2}$ is greater than 5 and the color change $\Delta E$ resulting from a tilting of the rearview mirror by 45° from the perpendicular viewing angle as a function of the magnitude of the color value $a_0$ according to CIE is not greater than $\Delta E \leq \frac{1}{2} \cdot (|a_0|-8)$ wherein $a_0 \leq -20$, $\Delta E \leq 6$ wherein $-20 \leq a_0 \leq 0$, and $\Delta E \leq \frac{1}{2} \cdot (a_0+12)$, especially $\leq \frac{1}{2} \cdot (a_0-3)$, preferably $\leq \frac{1}{3} \cdot (a_0-3)$, advantageously $\leq \frac{1}{6} \cdot (a_0-3)$, wherein $a_0 \leq 0$.

The intermediate layer may be made of semiconductor material.

28 Claims, 2 Drawing Sheets

REARVIEW MIRROR FOR MOTOR VEHICLES

Priority is claimed to European Patent Application No. EP 05 002 130.2, filed on Feb. 2, 2005 and to European Patent Application No. EP 05 010 582.4, filed on May 17, 2005. The entire disclosure of both applications is incorporated by reference herein.

The present invention relates to a rearview mirror for vehicles, especially for motor vehicles, having a layer substrate and a coating applied onto the back thereof, comprising a reflective mirror coating and an intermediate layer arranged between said reflective mirror coating and the layer substrate.

BACKGROUND

The production of rearview mirrors for motor vehicles normally endeavors to achieve an especially high reflection factor or reflection value of the mirror so that objects to the rear can be clearly recognized. For this reason, such automobile mirrors are usually made on the basis of a highly transparent support or layer substrate material that is provided with a highly reflective metal coating, for example, consisting of silver or aluminum. In conventional automobile mirrors, this reflective coating can normally be applied onto the back of the layer substrate so that the coating is protected by the layer substrate and by the mirror frame against direct environmental effects, especially dirt. Such mirror systems can achieve reflection values of more than 85% in the spectral range of visible light. On the other hand, however, such highly effective rearview mirrors entail the problem that such high reflection values could cause the driver to be blinded at night by the headlights of cars behind him.

So-called non-glare rearview mirrors have been developed that are supposed to reduce the blinding of drivers at night. Particularly for this purpose, the mirrors can be tinted. With an eye towards the recent developments in headlight systems for motor vehicles, in which halogen headlights are becoming more and more widespread, blue tinting has now been developed for rearview mirrors. Such a blue tinted mirror reflects the halogen headlights of the traffic behind the car more weakly than daylight so that at night, a glare-reducing effect is achieved. In order to produce such a low-glare rearview mirror, there is usually an intermediate layer arranged between the reflective mirror coating and the layer substrate, said intermediate layer providing the appropriate color tinting of the mirror. Thus, rearview mirrors are known, for example, from German patent DE 34 36 011 C1, in which these intermediate layers are configured as dielectric layers along the lines of an interference system. As an alternative, semiconductor layers can also be provided as reflective coatings, which can likewise be combined with dielectric layers as the intermediate layer in order to tint the mirror.

As an alternative, in order to avoid or reduce the risk of glare, it has also been considered to produce metal mirrors in combination with fully colored glass or films. However, such mirrors are fairly complex to manufacture and assemble, as a result of which they have not found widespread use in the automotive sector as rearview mirrors. Another alternative approach for the production of such low-glare rearview mirrors is the integration of parts with a variable transmission into the mirror structure, whereby especially electrically controllable components in the form of electrochromic mirrors or LCD mirrors have been considered. However, these techniques are also quite demanding, especially in view of the requisite control measures that are supposed to bring about the achievable low reflection values exclusively in the concrete case of acute glare.

For these reasons, conventional rearview mirrors for motor vehicles are structured using the above-mentioned dielectric intermediate layers between the layer substrate and the reflective mirror coating. However, it has been found that even such mirror systems only inadequately live up to modern demands when it comes to glare behavior.

In addition to the requirements of low glare it can be desirable to equip a rearview mirror with a predeterminable colored tint.

SUMMARY OF THE INVENTION

An object of the present invention is to provide a mirror that retains a predefined tint, even under different viewing angles, and especially of creating a rearview mirror for motor vehicles of the type described that is configured so as to be especially reliable for use in motor vehicles, also when it comes to the modern, demanding requirements made of its reflective properties.

The present invention provides a rearview mirror wherein the layer system comprising the intermediate layer arranged on the layer substrate and the reflective mirror coating arranged thereupon is configured in such a way that the magnitude of the parameter for the coloring $C=\sqrt{a_0^2+b_0^2}$ is greater than 5 and in that the color change $\Delta E$ resulting from a tilting of the rearview mirror by 45° from the perpendicular viewing angle as a function of the magnitude of the color value a according to CIE is not greater than $\Delta E \leq \frac{1}{2} \cdot (|a_0|-8)$ wherein $a_0 \leq -20$, $\Delta E \leq 6$ wherein $-20 \leq a_0 \leq 0$ and $\Delta E \leq \frac{1}{2} \cdot (a_0+12)$, especially $\leq \frac{1}{2} \cdot (a_0-3)$, preferably $\leq \frac{1}{3} \cdot (a_0-3)$, advantageously $\leq \frac{1}{6} \cdot (a_0-3)$, wherein $a_0 \geq 0$.

The definition makes use of the color coordinates L, a and b in the so-called L a b color space as is commonly employed for the quantitative and/or qualitative characterization of color properties and stipulated by the International Commission on Illumination (Commission Internationale de l'Eclairage CIE). The color coordinates that are characteristic for the rearview mirror are measured with perpendicular light incidence ($L_0$, $a_0$, $b_0$) on the rearview mirror on the one hand and with light incidence at an angle of 45° ($L_{45}$, $a_{45}$, $b_{45}$) on the other hand. The measured values thus obtained were used to determine the differential values on the basis of the relationships $\Delta L=L_{45}-L_0$, $\Delta a=a_{45}-a_0$ and $\Delta b=b_{45}-b_0$. The color change $\Delta E$ can be determined from these differential values on the basis of the relationship $\Delta E=\sqrt{\Delta L^2+\Delta a^2+\Delta b^2}$ and this constitutes a quantitative or technical measure of the change in the color of the rearview mirror as a result of a tilting of the rearview mirror by 45° from the perpendicular viewing angle. Additionally, a characteristic parameter for the coloring can be determined according to the relationship $C=\sqrt{a_0^2+b_0^2}$.

A further or alternate object of the present invention is to provide a rearview mirror that meets demands in terms of its non-glare properties that fulfill two criteria, among others. On the one hand, the rearview mirror should have adequately low glare vis-à-vis the modern headlight systems used in motor vehicles. In particular, it should be taken into consideration that the blue tinting normally applied to the rearview mirrors was aimed specifically at the halogen headlight technology widely found in motor vehicles. However, in modern motor vehicles, new headlight systems are increasingly being used such as, for example, high intensity discharge lamps (HID headlights) or white LED's. These systems especially have the feature that the focal point of the emitted light shifts towards shorter wavelengths, that is to say, in the direction of blue. In the case of such systems, the blue tinting of a rearview mirror consequently no longer has it has a glare-reducing effect but rather, in fact, a glare-intensifying effect. In order to offset this, it should be possible to shift the tinting of the rearview mirror in the direction of green or more in the direction of red and to provide for sufficient coloring of the rearview mirror. On the other hand, however, the glare protection should be adapted specifically to the intended use in the automotive realm. Here, it should especially be taken into account that the given coloring could have an effect not only in case of perpendicular light incidence on the rearview mirror but also at different angles of incidence. Accordingly, the mirror should be configured specifically to retain its color properties, even if the light comes from different angles of incidence. In order to meet these two criteria, on the one hand, the magnitude of the a-value in the CIE L a b color space should be selected sufficiently large. On the other hand, the characteristic value for the color change resulting from a tilting of the mirror by 45° from the perpendicular viewing angle should be kept sufficiently small so that a prescribed color tone is retained even at different viewing angles.

Advantageously, the rearview mirror has a red tint. For this purpose, preferably the color value $a_0>0$ is chosen.

Especially with a view of its use for motor vehicles it is desirable to set an absolute limit to the possible color change. In a preferred embodiment the color change $\Delta E$ is not greater than 18, in another preferred embodiment the color change is not greater than 6.

So as to be able to reliably adhere to the envisaged parameters $\Delta E$ and a of the rearview mirror, in one variant of the invention, the intermediate layer of the rearview mirror is made of semiconductor material. Thus, the layer structure of the rearview mirror is characterized by a metal/semimetal/glass arrangement, whereby the viewer looks at the glass side. As has been surprisingly found, the commonly employed materials or material groups cannot achieve the configuration now envisaged for the layer system in order to shift the tinting or the so-called design wavelengths from blue in the direction of green or even red while causing only a slight simultaneous resultant color change $\Delta E$. In contrast, however, this is possible if the intermediate layer is made of semiconductor material. Preferably, silicon, germanium or a mixture of silicon and germanium is provided as the semiconductor material.

In order to be able to very flexibly adapt the properties of the layer system and thus of the rearview mirror in its entirety to the desired specifications, the semiconductor material is preferably mixed with, aluminum (Al), boron (B), nitrogen (N), hydrogen (H) and/or oxygen (O).

For especially high-quality and homogeneous layer properties, in an advantageous embodiment, the intermediate layer is applied onto the layer substrate by means of cathodic sputtering, especially in a vacuum and/or in an argon atmosphere. In an advantageous embodiment, the layer substrate is a soda-silicate glass and, thanks to its transmissivity, especially favorable optical properties can be attained for the mirror as a whole.

Especially favorable properties with regard to the intended use of the rearview mirror are attainable if the optical layer thickness, i.e. the product of actual layer thickness and the refraction index, of the semiconductor material advantageously are chosen between around 135 nm up to around 240 nm, alternatively advantageously between around 135 nm up to around 240 nm plus the integral multiple of 275 nm. With this choice of layer thickness the rearview mirror is particularly advantageously suited to a design or structure wavelength $\lambda$ of around 550 nm, which approximates to the maximum light sensitivity of the human eye during the day (light vision). Surprisingly, it has been found that especially the spectral design of the layer system enables an especially low angle dependency. The choice of the layer thickness within the above-mentioned thickness interval secures that the optical layer thickness falls within an especially favorable interval between $1,0\times\lambda/4$ und $1,8\times\lambda/4$, alternatively possibly designed for the next interference order.

Moreover, in order to achieve an especially flexible adaptation of the optical properties to any other specifications, in an additional or alternative advantageous embodiment, the intermediate layer, in turn, has a multilayered structure made up of several semiconductor layers. Here, especially several semiconductor layers having different optical properties can be combined so as to ensure particularly preferred or desired effects. As an alternative or additionally, in an advantageous embodiment, the intermediate layer consists of a number of dielectric layers. Here, one or two additional dielectric layers can be inserted especially in front of, behind or between the individual semiconductor layers, wherein their optical thickness is advantageously selected below $0.9\ \lambda/2$, preferably below $0.6\ \lambda/2$, alternatively possibly configured for the next inference order (wherein $\lambda$ specifies the design wavelength). Preferably, the entirety of dielectric layers has an optical layer thickness of less than 240 nm, preferably less than 160 nm, alternatively preferably of less than 240 nm plus an integral multiple of 275 nm. The material used here is preferably tin oxide ($SnO_2$). Such a configuration ensures that the dielectric layers do not substantially affect the optical properties of the layer system, especially the coloration.

Advantageously, the rearview mirror is configured for an especially low glare effect from following motor vehicles (with differing headlight construction) especially in darkness. Furthermore, the reflective layer advantageously has a spectral reflective behavior which allows for a relative reduction of reflection values compared to viewing with the light-adapted eye with regard to light types A and C by at least 10%, or preferably by 20%. In other words, the relation of the reflection values of darkness-adapted eye to light-adapted eye for light types A and C, respectively, is preferably at the most 90%, advantageously at the most 80%.

Light types C and A specify herein a typical spectrum during daylight (light type C) and at night (light type A). The integral reflection values for "photopic vision" and "scotopic vision" can be determined herein following the relevant eye sensitivity curves according to CIE 1951. The stated ratio of reflection values M* is the greater of the two ratios reflection (light type A, scotopic)/reflection (light type A, photopic) and reflection (light type C, scotopic)/reflection (light type, scotopic) and mirrors the low glare of the mirror. If the value is below 1, a reduced reflection for both normed light types A and C is noticeable with scotopic vision.

Advantageously, the rearview mirror is specifically configured for use in motor vehicles with regard to its characteristic nominal reflection values. To ensure herein a sufficiently high reflection effectiveness the reflection factor R(A) is advantageously at least 40%. To on the other hand avoid glare for the driver through reflection that is too high, the reflection factor R(A) is 70% at the most with regard to light type A in an alternative or additional embodiment.

Particularly high-quality reflection properties can be achieved in an advantageous embodiment in that the reflective mirror coating is made of silver (Ag), aluminum (Al), chromium (Cr), nickel (Ni), titanium (Ti) or an alloy of these metals. In an especially advantageous embodiment, silver is selected as the material for the reflective mirror coating.

Moreover, it has been found that the achievable reflectivity might decrease as a result of absorption in the semiconductor layer. In order to counteract this and to increase the reflection, the semiconductor layer can preferably be made relatively thinner and the dielectric layer can be made relatively thicker, whereby the angle-dependence, in turn, increases.

For especially high-quality and homogeneous layer properties, in an advantageous embodiment, the intermediate layer is applied onto the layer substrate by means of cathodic sputtering, especially in a vacuum and/or in an argon atmosphere. In an advantageous embodiment, the layer substrate is a soda-silicate glass and, thanks to its transmissivity, especially favorable optical properties can be attained for the mirror as a whole.

Advantageously, the intermediate layer is amorphous. Advantageously, the coating is applied onto the back to protect the layer substrate to protect the layer substrate from damages or other damaging outside influences. In another preferred embodiment a hydrophilically and/or photocatalytically active coating as known from EP 0 689 962 is applied onto the front of the layer substrate.

Preferably, the rearview mirror is provided in the manner of a "classic reflector" having a comparatively low transmission. For this purpose, the transmission of the complete system, composed of the layer substrate and the coating arranged thereupon, exceeds not more than 10%, preferably not more than 2%. This is particularly achievable having a comparatively thick reflection layer so that the sensitivity compared to the corrosion can be kept especially low. In addition, layer thickness fluctuations due to manufacturing, have negligible affect in such systems.

The advantages achieved with the invention lie especially in the fact that, by specifically configuring the rearview mirror to have more of a green or red tint, that is to say, with a color value a according to CIE of more than 5, on the one hand, a desired coloration can be maintained for design purposes, and/or, on the other hand, the blinding of the driver at night can be kept to a minimum, even in the case of the modern headlight systems used in motor vehicles. Due to the additionally proposed configuration, namely, that the color change ΔE resulting from a change of the incident angle is limited to relatively low values, it is also ensured that the desired coloration is retained, even at different viewing angles, or else that blinding of the driver is especially reliably prevented in various operating situations of the motor vehicle. By using semiconductor materials as the intermediate layer between the layer substrate and the reflective mirror coating, the optical properties of the mirror are especially variable and can be set with large bandwidths, whereby this especially achieves the envisaged configuration of the tinting and color change. Thus, the mirror is preferably also suitable for applications in which a certain coloration is desired for design reasons.

BRIEF DESCRIPTION OF THE DRAWINGS

An embodiment of the invention is explained in greater depth with reference to the drawings, in which.

DETAILED DESCRIPTION

Figure 1:
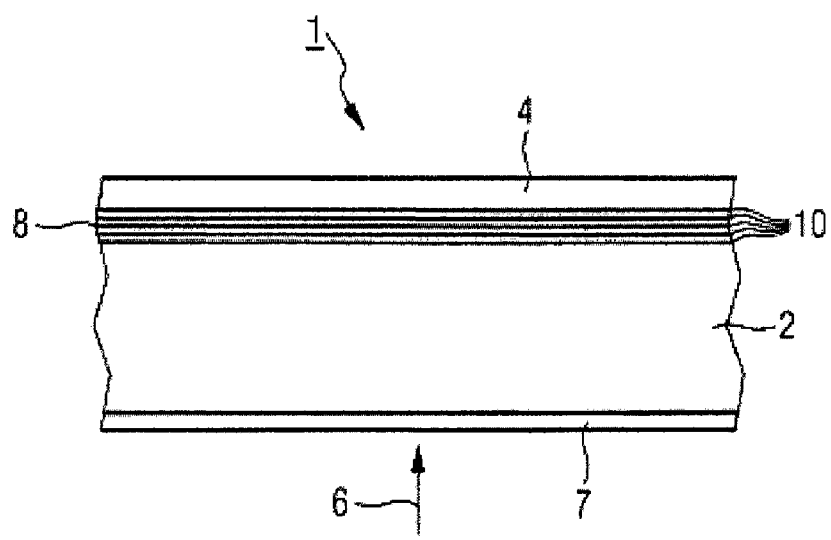
FIG. 1 shows a schematic section of a rearview mirror for motor vehicles.

The same parts are designated with the same reference numerals in all of the figures.

The rearview mirror 1 shown in a sectional view in FIG. 1 is intended for use in a motor vehicle. It comprises a layer substrate 2 that, in the embodiment, is transparent and made of soda-silicate glass. In order to ensure the reflective properties, a reflective mirror coating 4 made of a suitably selected metal or semiconductor material is provided. In the embodiment, silver (Ag) has been chosen for this purpose; however, as an alternative, another suitable reflective material could be employed such as especially aluminum, chromium, nickel, titanium or an alloy of these materials. In order to protect the reflective mirror coating 4 against damage or harm due to direct environmental effects, dirt and the like, the coating is applied onto the back, that is to say, on the side of the layer substrate 2 facing away from the viewing angle or direction of incidence of the light indicated by the arrow 6. Onto the front of layer substrate 2 a hydrophilically and/or photocatalytically active coating 7 is applied.

The rearview mirror 1 is suitably designed to meet specific prescribed optical parameters. For this purpose, in addition to the reflective mirror coating 4, the coating applied onto the layer substrate 2 has an intermediate layer 8 that is arranged between the mirror coating 4 and the layer substrate 2. The intermediate layer 8, in turn, has a multi-layered structure and consists of a number of individual layers 10.

Figure 2:
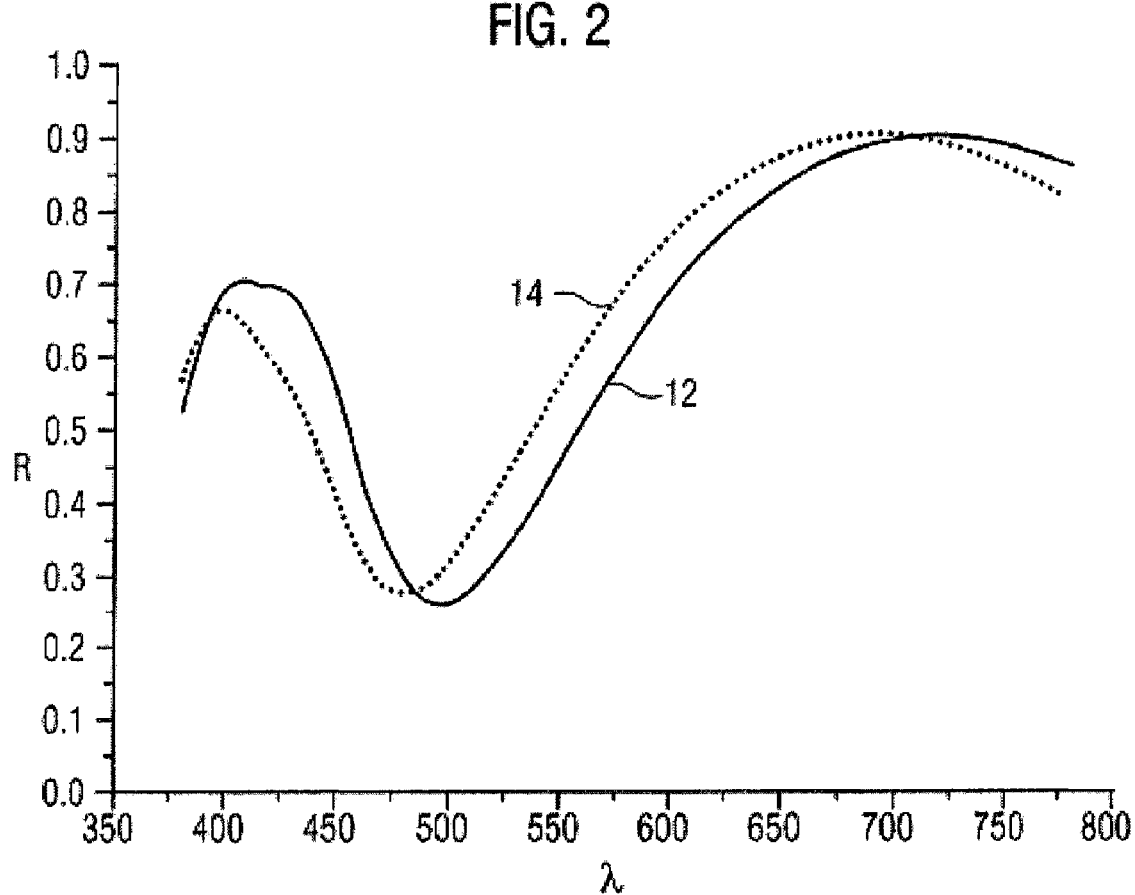
FIG. 2 shows a diagram with a reflection curve of a rearview mirror according to the state of the art.

In order to explain the special optical properties of the rearview mirror 1, below, so-called reflection curves will be used of the type shown by way of an example in FIG. 2 for a rearview mirror known from the state of the art. In this context, in the diagram according to FIG. 2, the wavelength λ of the light striking the rearview mirror is plotted in nanometers on the x-axis as a functional dependency. The reflection factor R, namely, the proportion of reflected light, is plotted on the y-axis. FIG. 2 shows the corresponding measured values for a red-reflective mirror that was produced with an interference layer system and with a metal reflector according to methods known from the state of the art. This rearview mirror comprises a float glass as the layer substrate having a thickness of 2 mm on which a layer consisting of nickel-chromium (NiCr) having a layer thickness of 3.3 nm and over it a dielectric layer consisting of zinc sulfide (ZnS) having a layer thickness of 134 nm are applied. Over the latter, a silver coating with a thickness of 100 nm is applied as a metallic mirror coating. For this mirror, in FIG. 2, a solid curve 12 depicts the wavelength-dependence of the reflection factor R when the light incidence is perpendicular, that is to say, at an angle of incidence of 0°. In comparison to this, the dotted line 14 shows the wavelength-dependence of the reflection factor R for this mirror when the light incidence has been tilted by 45°, that is to say, with an angle of incidence of 45°. As can be readily seen in the diagram in FIG. 2, the curves 12 and 14 differ considerably from each other. Thus, in the case of a light incidence tilted by 45°, the reflection behavior of the mirror shown there differs considerably from the case with perpendicular light incidence, so that the color effect and the glare reduction depend substantively on the angle of incidence of the light. In this manner, it is documented that the mirror shown there in a representative manner is only suitable to a limited extent for use in motor vehicles, where special attention is to be paid to avoiding blinding of the driver.

Figure 3:
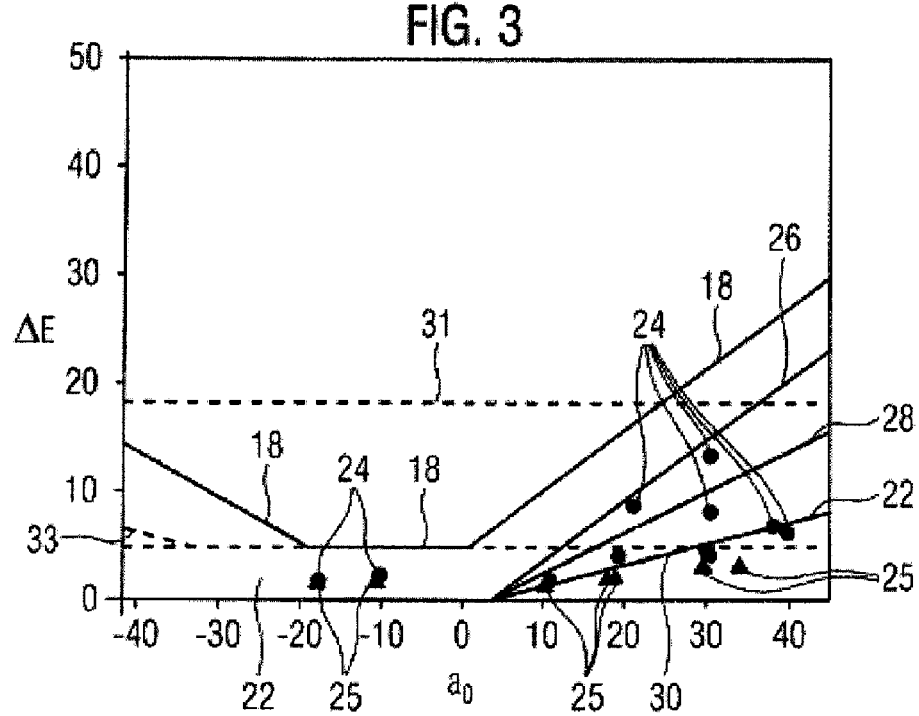
FIG. 3 shows a diagram with value pairs a, ΔE.

Such measured results are compiled in the diagram of FIG. 3 for a plurality of rearview mirrors. In the diagram shown there, the color value $a_0$ according to CIE is plotted on the x-axis. The color change $\Delta E$ resulting from tilting the rearview mirror by 45° from the perpendicular viewing angle is plotted on the y-axis. The color change $\Delta E$ is determined on the basis of the relationship $\Delta E = \sqrt{\Delta L^2 + \Delta a^2 + \Delta b^2}$, wherein L, a and b represent the color coordinates in the CIE L a b color space. Here, the color coordinates are measured with a perpendicular light incidence ($L_0$, $a_0$, $b_0$) and at an angle of 45° ($L_{45}$, $a_{45}$, $b_{45}$). The measured values were used to determine the differential values on the basis of the relationships $\Delta L = L_{45} - L_0$, $\Delta a = a_{45} - a_0$ and $b_{45} - b_0$. The color change $\Delta E$, in turn, can be determined from these differential values, on the basis of the above-mentioned relationship. The symbols shown in the diagram according to FIG. 3 characterize a plurality of rearview mirrors with respect to each relevant parameter.

In order to fulfill the requirements made of a stable coloration, even under different viewing angles, or of reliable low-glare properties, also with an eye towards modern headlight systems for motor vehicles and varying angles of incidence, the rearview mirror 1 according to the invention shown schematically in FIG. 1 is specifically configured so that the color change $\Delta E$ resulting from a tilting of the rearview mirror by 45° from the perpendicular viewing angle as a function of the magnitude of the color value a according to CIE is not greater than $$\Delta E \leq \frac{1}{2} \cdot (|a_0| - 8) \text{ wherein } a_0 \leq -20,$$

$$\Delta E \leq 6 \text{ wherein } -20 \leq a_0 \leq 0, \text{ and}$$

$$\Delta E \leq \frac{1}{2} \cdot (a_0 + 12) \text{ wherein } a_0 \geq 0.$$

The outer boundary line provided for by this interpretation criterion is shown by line 18, made up of three partial straight lines in FIG. 3. In the diagram according to FIG. 3, the rearview mirror 1 according to FIG. 1 is thus characterized in that the value pair $\Delta E$, a corresponding thereto lies in the area 22 delineated by the lines 18. In the diagram according to FIG. 3, a number of value pairs for rearview mirrors according to the invention have been plotted, wherein the circles 24 represent hybrid mirrors with a combination of a semiconductor layer and a dielectric layer, while the triangles 25 represent rearview mirrors with just one semiconductor layer.

Advantageously, the rearview mirror 1 is also configured in such a way that $\Delta E \leq \frac{1}{2} \cdot (a_0 - 3)$, preferably $\leq \frac{1}{3} \cdot (a_0 - 3)$, advantageously $\leq \frac{1}{6} \cdot (a_0 - 3)$, wherein $a_0 \geq 3$ wherein especially a>0 is selected. The boundary lines for these areas are shown in the diagram according to FIG. 3 by the straight lines 26, 28, 30.

Additionally, rearview mirror 1 is configured so that $\Delta E$ is not greater than 18, preferably smaller than 6. The boundary line for the area mentioned first is shown by dotted line 31 in FIG. 3, for the area mentioned second by dotted line 33.

In order to be able to comply with the characteristic values, the intermediate layer 10 of the rearview mirror 1 is made of semiconductor material. Here, especially silicon (Si), germanium (Ge) or a mixture of silicon and germanium can be provided. Moreover, depending on the requirements made of the optical properties, the semiconductor material can be mixed with nitrogen (N), hydrogen (H) and/or oxygen (O). Moreover, depending on the optical requirements, as shown in the embodiment according to FIG. 1, a plurality of individual layers 10 made of various semiconductor materials can be provided which, if necessary, can also be augmented by additional dielectric layers.

In the embodiment, the layer substrate 2 of the rearview mirror 1 is a float glass having a thickness of 2 mm. On this glass, as an intermediate layer 8, there is a layer made of amorphous silicon (a-Si). The intermediate layer 8 as well as the reflective mirror coating 4 are applied onto the layer substrate 2 by means of cathodic sputtering in a vacuum in an argon atmosphere.

As specific embodiments for which the relevant parameters are plotted in the diagram according to FIG. 3, a number of rearview mirrors 1 were made with the structure shown in FIG. 1, wherein 6.9 nm, 11 nm, 56 nm, 65 nm and 88 nm, among others, were taken as the layer thicknesses for the intermediate layer 8. Then the reflective mirror coating 4, namely, an optically dense and highly reflective silver coating having a layer thickness of 100 nm, was sputtered on. This structure can additionally be coated with copper for purposes of protection against external influences and it can subsequently be painted. In the diagram according to FIG. 3, the mirrors thus obtained are plotted with their relevant characteristic data in the form of the triangles 25. It can be seen here that, without exception, the triangles 25 all lie in the area 22 that is considered to be relevant.

The precise parameter values for a number of embodiments of rearview mirrors 1 made in this manner are compiled in Table 1. Here, for each embodiment, the table indicates the type (HL stands for the layer structure made up of substrate-semiconductor-layer-mirror layer; hybrid stands for the layer structure made up of substrate-semiconductor layer-dielectric-layer-mirror layer), the color tint, the layer thickness of metallic absorbing layer dsNiCr, the amorphous silicon layer, factually ds_a Si and optically ds_a Si_opt, the semiconductor layer, factually ds_SnO2 and optically ds_SnO2_opt, the reflector material, the resultant reflection factor R(A), the color coordinates in case of perpendicular light incidence ($L_0$, $a_0$, $b_0$), the resultant color change $\Delta E$ the ratio M* of reflection values for darkness adapted eyes to the reflection values of light adapted eye as well as the coloring parameter.

TABLE 1

| Consec. No. | Type | Tint | ds NiCr | ds a-Si | ds a-Si opt | ds SnO2 | ds SnO2 opt | Reflector | R(A) | a0 | b0 | ΔE | M* | C | T(A) | Comments |
|---|---|---|---|---|---|---|---|---|---|---|---|---|---|---|---|---|
| 1 | HL | red | — | 56 | 269 | 0 | 0 | Ag (100 nm) | 46% | 18 | 15 | 1.7 | 0.69 | 23.4 | 0.0% | |
| 2 | HL | red | — | 65 | 312 | 0 | 0 | Ag | 30% | 30 | −6 | 2.8 | 0.92 | 30.6 | | |

TABLE 1-continued

| Consec. No. | Type | Tint | ds NiCr | ds a-Si | ds a-Si opt | ds SnO2 | ds SnO2 opt | Reflector | R(A) | a0 | b0 | ΔE | M* | C | T(A) | Comments |
|---|---|---|---|---|---|---|---|---|---|---|---|---|---|---|---|---|
| 3 | HL | red | — | 11 | 52.8 | 0 | 0 | Ag | 20% | 35 | 8 | 2.9 | 0.53 | 35.9 | | |
| 4 | HL | red | — | 6.9 | 33.1 | 0 | 0 | Ag | 51% | 10 | 37 | 1.3 | 0.55 | 38.3 | | |
| 5 | HL | green | — | 88 | 422 | 0 | 0 | Ag | 27% | −18 | −5 | 1.4 | 1.29 | 18.7 | | |
| 6 | HL | green | — | 95 | 456 | 0 | 0 | Ag | 33% | −11 | 2 | 1.5 | 1.06 | 11.2 | | |
| 7 | hybrid | green | — | 89 | 427 | 20 | 20 | Ag | 36% | −10 | 5 | 2.3 | 1.03 | 11.2 | | |
| 8 | hybrid | green | — | 85 | 408 | 10 | 10 | Ag | 28% | −18 | −4 | 1.9 | 1.26 | 18.4 | | |
| 9 | hybrid | red | — | 45 | 216 | 37 | 37 | Ag | 56% | 11 | 26 | 2.1 | 0.66 | 28.2 | | |
| 10 | hybrid | red | — | 45 | 216 | 55 | 109 | Ag (100 nm) | 52% | 20 | 25 | 3.9 | 0.57 | 32.0 | 0.0% | |
| 11 | hybrid | red | — | 45 | 216 | 135 | 68 | Ag | 47% | 31 | 18 | 8.1 | 0.54 | 35.8 | | |
| 12 | hybrid | red | — | 51 | 245 | 80 | 40 | Ag | 42% | 30 | 12 | 4.6 | 0.63 | 32.3 | | |
| 13 | hybrid | red | — | 51 | 245 | 107 | 54 | Ag | 36% | 38 | 5 | 6.7 | 0.66 | 38.3 | | |
| 14 | hybrid | red | — | 55 | 264 | 42 | 21 | Ag | 38% | 31 | 7 | 4 | 0.70 | 31.8 | | |
| 15 | hybrid | red | — | 55 | 264 | 4488 | 44 | Ag | 29% | 40 | −7 | 6.1 | 0.85 | 40.6 | | |
| 16 | hybrid | red | — | 40 | 192 | 151 | 76 | Ag | 58% | 21 | 26 | 8.8 | 0.55 | 33.4 | | |
| 17 | hybrid | red | — | 40 | 192 | 163 | 82 | Ag | 54% | 31 | 18 | 13 | 0.53 | 35.8 | | |
| 18 | hybrid | red | — | 54 | 140 | 116 | 230 | Ag | 63% | 21 | 9.2 | 11 | 0.81 | 22.8 | | |
| 19 | hybrid | red-yellow | — | 52 | 231 | 40 | 80 | Ag | 48% | 23 | 22 | 3.8 | 0.56 | 32.2 | | |
| 20 | hybrid | red | — | 58 | 173 | 110 | 219 | Ag | 47% | 28 | 5.5 | 9.7 | 0.84 | 28.8 | | |
| 21 | hybrid | red | — | 64 | 173 | 105 | 209 | Ag | 57% | 23 | 11 | 8.9 | 0.78 | 25.8 | | |
| 22 | hybrid | yellow | — | 39 | 173 | 75 | 149 | Ag | 68% | 2.1 | 39 | 3.9 | 0.65 | 39.0 | | |
| 23 | hybrid | yellow | — | 51 | 228 | 37 | 74 | Cr | 50% | 9.2 | 25 | 2.4 | 0.66 | 26.5 | | Cr-reflector |
| 24 | hybrid | red | — | 54 | 173 | 100 | 199 | Ag | 50% | 40 | 13 | 17 | 0.61 | 42.4 | | |
| 25 | hybrid | yellow-red | — | 58 | 173 | 90 | 179 | Ag | 62% | 22 | 28 | 16 | 0.53 | 36.2 | | |
| 26 | hybrid | red | — | 64 | 173 | 115 | 229 | Ag | 53% | 15 | 7 | 10 | 0.91 | 16.2 | | |
| 27 | hybrid | yellow-red | — | 71 | 173 | 95 | 189 | Ag | 71% | 12 | 18 | 9.5 | 0.76 | 21.7 | | |
| 28 | hybrid | red-yellow | — | 71 | 173 | 105 | 209 | Ag | 66% | 13 | 11 | 6.5 | 0.84 | 17.4 | | |
| 29 | hybrid | red-yellow | — | 58 | 173 | 95 | 189 | Ag | 58% | 29 | 22 | 15.9 | 0.57 | 36.1 | | |
| 30 | hybrid | red | — | 58 | 173 | 235 | 468 | Ag | 59% | 28 | 16 | 14.2 | 0.70 | 32.3 | | 2nd order SnO2 |
| 31 | SdT | blau | 3.0 | — | — | 80 | 159 | Ag | 48% | −7 | −29 | 8.2 | 1.38 | 29.6 | | |
| 32 | SdT | green | 3.0 | — | — | 97 | 193 | Ag | 72% | −16 | −3 | 10.7 | 1.17 | 16.8 | | |
| 33 | SdT | yellow-green | 3.0 | — | — | 112 | 224 | Ag | 86% | −15 | 18 | 9.4 | 0.98 | 23.2 | | |
| 34 | SdT | yellow | 3.0 | — | — | 128 | 255 | Ag | 86% | −8 | 31 | 7.7 | 0.83 | 32.2 | | |
| 35 | SdT | yellow | 3.0 | — | — | 144 | 286 | Ag | 75% | 3 | 33 | 8.8 | 0.72 | 32.8 | | |
| 36 | SdT | red-yellow | 3.0 | — | — | 160 | 318 | Ag | 58% | 20 | 14 | 19.8 | 0.70 | 24.8 | | |
| 37 | SdT | red | 3.0 | — | — | 174 | 346 | Ag | 44% | 35 | −18 | 29.2 | 0.94 | 38.9 | | |
| 38 | HL | red | — | 56 | 269 | 0 | 0 | Ag(45 nm) | 45% | 19 | 14 | 1.8 | 0.70 | 23.0 | 1.9% | |
| 39 | HL | red | — | 56 | 269 | 0 | 0 | Ag(23 nm) | 39% | 19 | 8 | 2.1 | 0.77 | 20.7 | 9% | |
| 40 | HL | red | — | 56 | 269 | 0 | 0 | Ag(8.0 nm) | 29% | 18 | −4 | 2.2 | 0.95 | 18.2 | 19% | |
| 41 | hybrid | red | — | 45 | 216 | 55 | 109 | Ag(39 nm) | 51% | 20 | 23 | 4.2 | 0.58 | 30.7 | 1.9% | |
| 42 | hybrid | red | — | 45 | 216 | 55 | 109 | Ag(19 nm) | 46% | 23 | 17 | 4.9 | 0.62 | 28.6 | 9% | |
| 43 | hybrid | red | — | 45 | 216 | 55 | 109 | Ag(9.0 nm) | 38% | 22 | 9 | 4.5 | 0.72 | 24.0 | 19% | |

For the last-mentioned examples, the degree of transmission T of the complete system, comprising the substrate layer 2 and the coating, is less than 10%, preferably less than 2%.

The rearview mirror 1 whose intermediate layer 8 was made with a thickness of 56 nm is, or example, ultimately a red-reflective mirror whose color value a according to CIE is 18. The value ascertained for this mirror for the color change ΔE as a result of the tilting by 45° is only 1.7. The alternatively produced mirror whose intermediate layer 8 had a thickness of 88 nm is a green-reflective mirror whose color value a according to CIE is 18, for which the ascertained color change ΔE is likewise very low and yields a value of just 1.4.

Figure 4:
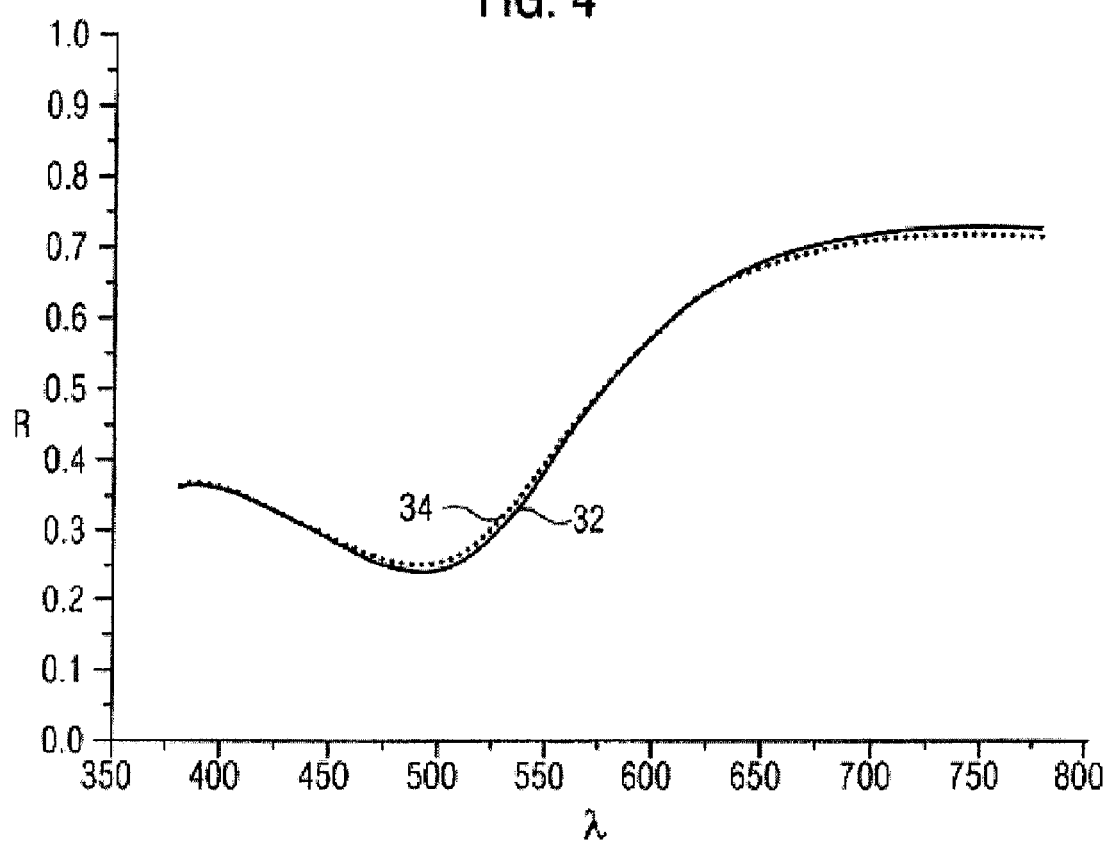
FIG. 4 shows a diagram with a reflection curve for a rearview mirror.

The good optical properties obtained here for the rearview mirror 1, whose intermediate layer 8 had a layer thickness of 56 nm, are shown in the form of the reflection curve in FIG. 4. There, the reflection factor R is likewise plotted as a function of the wavelength λ, wherein the solid curve 26 represents the result for the perpendicular light incidence and the dotted curve 28 represents the result for the light incidence tilted by 45°. As the depiction according to FIG. 4 clearly shows, the curves 32 and 34 hardly differ from each other; therefore, independent of the angle of incidence of the light, the rearview mirror 1 has virtually unchanged optical properties.

What is claimed is:

1. A rearview mirror for motor vehicles moveable between a perpendicular viewing angle to a tilted position 45° from the perpendicular viewing angle, comprising:
   a layer substrate; and
   a coating applied to the layer substrate, the coating including a reflective mirror coating and an intermediate layer disposed between the reflective mirror coating and the layer substrate, wherein a magnitude of a parameter for coloring $C=\sqrt{a_0^2+b_0^2}$ is greater than 5 wherein $a_0$ represents a first color coordinate value and $b_0$ represents a second color coordinate value at a perpendicular light incidence according to CIE and a color change ΔE resulting from a tilting of the rearview mirror to the tilted position as a function of a magnitude of the first color coordinate value $a_0$ is given by:

$\Delta E \leq \frac{1}{2} \cdot (|a_0|-8)$ when $a_0 \leq -20$;

$\Delta E \leq 6$ when $-20 \leq a_0 \leq 0$; or $\Delta E \leq \frac{1}{2} \cdot (a_0+12)$, when $a_0 \geq 0$.

2. The rearview mirror as recited in claim 1, wherein the color change $\Delta E$ is $\leq \frac{1}{3} \cdot (a_0-3)$ when $a_0 \geq 0$.

3. The rearview mirror as recited in claim 2, wherein the color change $\Delta E$ is $\leq \frac{1}{6} \cdot (a_0-3)$ when $a_0 \geq 0$.

4. The rearview mirror as recited in claim 1, wherein the color value $a_0 > 0$ is selected.

5. The rearview mirror as recited in claim 4, wherein the color change $\Delta E$ is not greater than 18.

6. The rearview mirror as recited in claim 1, wherein the intermediate layer includes a semiconductor material.

7. The rearview mirror as recited in claim 6, wherein the semiconductor material includes at least one of silicon and germanium.

8. The rearview mirror as recited in claim 6, wherein the intermediate layer includes the semiconductor material mixed with at least one of nitrogen, hydrogen and oxygen.

9. The rearview mirror as recited in claim 6, wherein the semiconductor material includes an optical layer thickness of between 135 nm up to 240 nm.

10. The rearview mirror as recited in claim 6, wherein the semiconductor material includes an optical layer thickness of between 135 nm up to 240 nm plus an integral multiple of 275 nm.

11. The rearview mirror as recited in claim 6, wherein intermediate layer has a multilayered structure and includes a plurality of semiconductor layers.

12. The rearview mirror as recited in claim 6, wherein the intermediate layer includes a plurality of dielectric layers.

13. The rearview mirror as recited in claim 12, wherein each of the plurality of dielectric layers includes tin oxide ($SnO_2$).

14. The rearview mirror as recited in claim 12, wherein the entirety of dielectric layers includes an optical layer thickness of less than 240 nm.

15. The rearview mirror as recited in claim 12, wherein the entirety of dielectric layers includes an optical layer thickness of less than 160 nm plus an integral multiple of 275 nm.

16. The rearview mirror as recited in claim 1, wherein the color change $\Delta E$ is not greater than 18.

17. The rearview mirror as recited in claim 1, wherein a ratio of reflection values to a darkness-adapted eye to reflection values to a light-adapted eye light types A and C, respectively, is not more than most 90%.

18. The rearview mirror as recited in claim 1, wherein a reflection factor for light type A is at least 40%.

19. The rearview mirror as recited in claim 18, wherein the reflection factor for light type A is advantageously not more than 70%.

20. The rearview mirror as recited in claim 1, wherein the mirror coating includes at least one of silver, aluminum, chromium, nickel, and titanium.

21. The rearview mirror as recited in claim 1, wherein the mirror coating includes an alloy including at least one of silver, aluminum, chromium, nickel, and titanium.

22. The rearview mirror as recited in claim 1, wherein the intermediate layer is applied to the layer substrate using cathodic sputtering.

23. The rearview mirror as recited in claim 1, wherein the layer substrate includes a soda-silicate glass.

24. The rearview mirror as recited in claim 1, wherein the intermediate layer is amorphous.

25. The rearview mirror as recited in claim 1, wherein the intermediate layer has a mean layer thickness of 3 nm to 200 nm.

26. The rearview mirror as recited in claim 25, wherein the mean layer thickness is 40 nm to 80 nm.

27. The rearview mirror as recited in claim 1, wherein a degree of transmission of the rearview mirror is not more than 10%.

28. The rearview mirror as recited in claim 27, wherein the degree of transmission is not more than 2%.

* * * * *